US011897088B2

(12) United States Patent
Oza et al.

(10) Patent No.: US 11,897,088 B2
(45) Date of Patent: Feb. 13, 2024

(54) AUTOMATED GEMSTONE FEEDING

(71) Applicant: Sahajanand Technologies Private Limited, Gujarat Surat (IN)

(72) Inventors: Chirag Dineshchandra Oza, Nagalpur (IN); Munjalkumar Dhirajlal Gajjar, Gujarat Surat (IN); Rahul Mahendrakumar Gaywala, Gujarat Surat (IN)

(73) Assignee: Sahajanand Technologies Private Limited, Gujarat Surat (IN)

( * ) Notice: Subject to any disclaimer, the term of this patent is extended or adjusted under 35 U.S.C. 154(b) by 1073 days.

(21) Appl. No.: 16/629,492

(22) PCT Filed: Oct. 16, 2018

(86) PCT No.: PCT/IB2018/058003
§ 371 (c)(1),
(2) Date: Jan. 8, 2020

(87) PCT Pub. No.: WO2019/077484
PCT Pub. Date: Apr. 25, 2019

(65) Prior Publication Data
US 2021/0129283 A1 May 6, 2021

(30) Foreign Application Priority Data
Oct. 17, 2017 (IN) .............................. 201721036967

(51) Int. Cl.
*B23Q 7/08* (2006.01)
*B23Q 7/16* (2006.01)
(Continued)

(52) U.S. Cl.
CPC ................ *B24B 9/163* (2013.01); *B23Q 7/08* (2013.01); *B23Q 7/16* (2013.01); *B24B 5/355* (2013.01);
(Continued)

(58) Field of Classification Search
CPC ... B23Q 7/08; B23Q 7/14; B23Q 7/16; B23Q 7/18; B24B 5/355; B24B 41/005; B24B 41/06; B65G 47/08
(Continued)

(56) References Cited

U.S. PATENT DOCUMENTS 3,425,169 A   2/1969 Dunn
6,077,154 A   6/2000 Takashi et al.
(Continued)

FOREIGN PATENT DOCUMENTS

DE          1943350 A1    3/1971
WO   WO-2008074174 A1    6/2008
WO   WO-2019077484 A1    4/2019

OTHER PUBLICATIONS

US 2008/0184552 A1, Lang, Aug. 7, 2008.*
(Continued)

*Primary Examiner* — Douglas A Hess
(74) *Attorney, Agent, or Firm* — Schwegman Lundberg & Woessner, P.A.

(57) ABSTRACT

The present subject matter relates to automated gemstone feeding in a gemstone processing machine. In an implementation, the gemstone processing machine has a feeding conduit unit to receive a rough gemstone affixed to a holder from a user. The feeding conduit unit delivers the holder to a base plate. An actuating arm picks the holder from the base plate and transfers the holder to a pre-defined position in the gemstone processing machine. The automated feeding mechanism is controlled by the computing device and uses low-cost hardware equipment having limited or no manual intervention. Thus, providing an apt tradeoff between the accuracy of transfer of the rough gemstone and the cost associated with the equipment used for the processing of the gemstone.

19 Claims, 10 Drawing Sheets

(51) Int. Cl.
    *B23Q 7/18* (2006.01)
    *B65G 47/08* (2006.01)
    *B24B 9/16* (2006.01)
    *B24B 5/35* (2006.01)
    *B24B 41/00* (2006.01)
    *B24B 41/06* (2012.01)
    *B23Q 7/14* (2006.01)

(52) U.S. Cl.
    CPC ............ *B24B 41/005* (2013.01); *B24B 41/06* (2013.01); *B65G 47/08* (2013.01); *B23Q 7/14* (2013.01); *B23Q 7/18* (2013.01)

(58) Field of Classification Search
    USPC .......... 198/418; 414/416.05, 749.6; 221/178, 221/290, 292
    See application file for complete search history.

(56) References Cited

U.S. PATENT DOCUMENTS

| | | | |
|---|---|---|---|
| 6,345,728 B1 * | 2/2002 | Kawaguchi | H05K 13/043 |
| | | | 221/290 |
| 6,672,476 B2 * | 1/2004 | Cash | F41A 9/84 |
| | | | 221/292 |
| 7,975,362 B2 * | 7/2011 | Gysi | B23P 23/06 |
| | | | 198/690.1 |

OTHER PUBLICATIONS

"International Application No. PCT/IB2018/058003, Article 19 amendments as received on Mar. 27, 2019", (Mar. 27, 2019), 10 pgs.

"International Application No. PCT/IB2018/058003, International Search Report and Written Opinion dated Jan. 28, 2019", (Jan. 28, 2019), 8 pgs.

\* cited by examiner

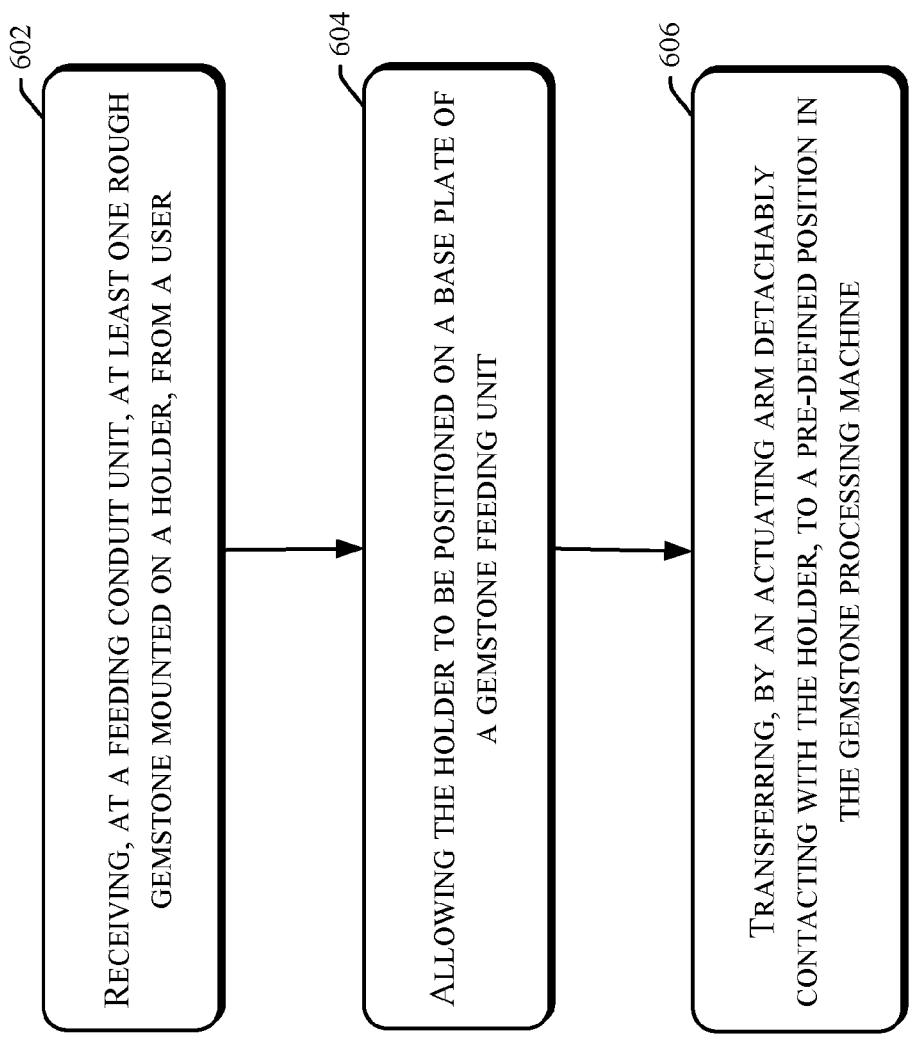

AUTOMATED GEMSTONE FEEDING

PRIORITY CLAIM TO RELATED APPLICATIONS

This application is a U.S. national stage filing under 35 U.S.C. § 371 from International Application No. PCT/IB2018/058003, filed on 16 Oct. 2018, and published as WO2019/077484 on 25 Apr. 2019, which claims the benefit under 35 U.S.C. 119 to India Application No. 201721036967, filed on 17 Oct. 2017, the benefit of priority of each of which is claimed herein, and which applications and publication are hereby incorporated herein by reference in their entirety.

TECHNICAL FIELD

The present subject matter relates, in general, to gemstone processing and, particularly but not exclusively, to gemstone processing machines.

BACKGROUND

Gemstones are naturally occurring deposits of minerals and can include, for example, diamonds, quartz, opals, sapphires, rubies, emeralds, and topaz. Since the gemstones are rare, they are highly valued for use. The value of these gemstones results from their color, luster, and the manner in which they transmit, refract, or reflect rays of light. For the enhancement of such properties, rough gemstones are processed, by various techniques, such as cutting, faceting, shaping, and polishing. Thus, techniques for effective gemstone processing have been areas of active research.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

FIG. 6 elaborates a method for feeding gemstones in a gemstone processing machine, according to an implementation of the present subject matter.

DETAILED DESCRIPTION

Figure 1:
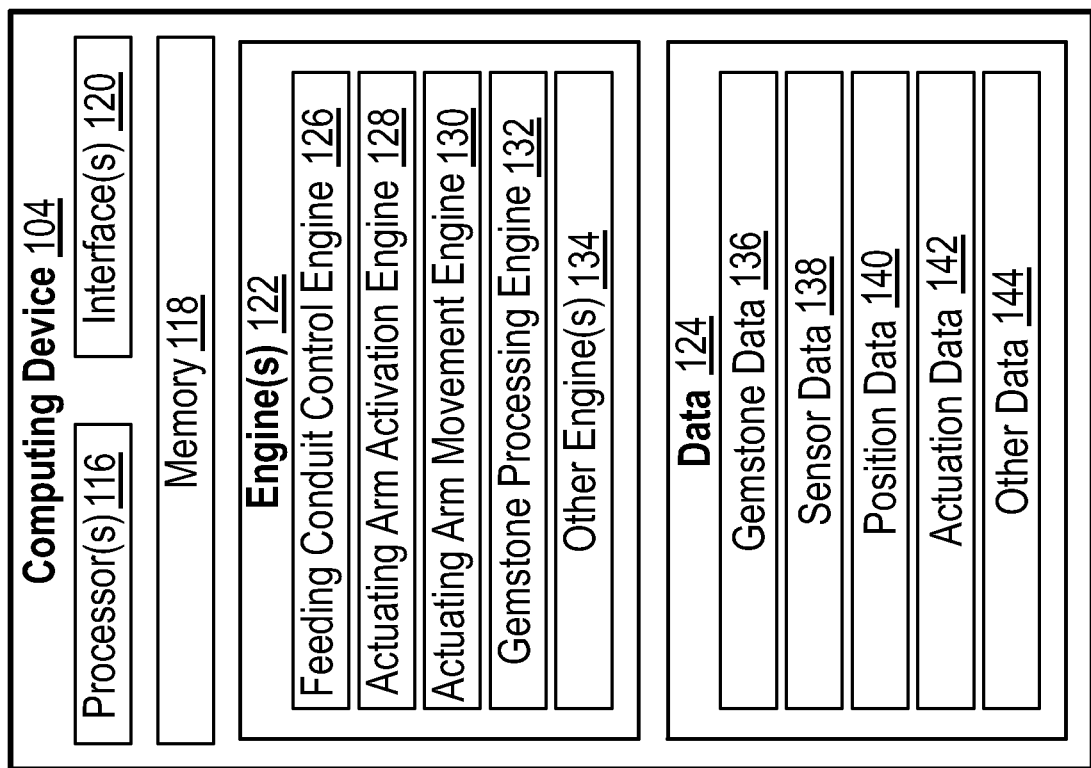
FIG. 1 illustrate schematics of a gemstone processing machine communicatively coupled to a computing device, in accordance with an embodiment of the present subject matter.
Figure 1:
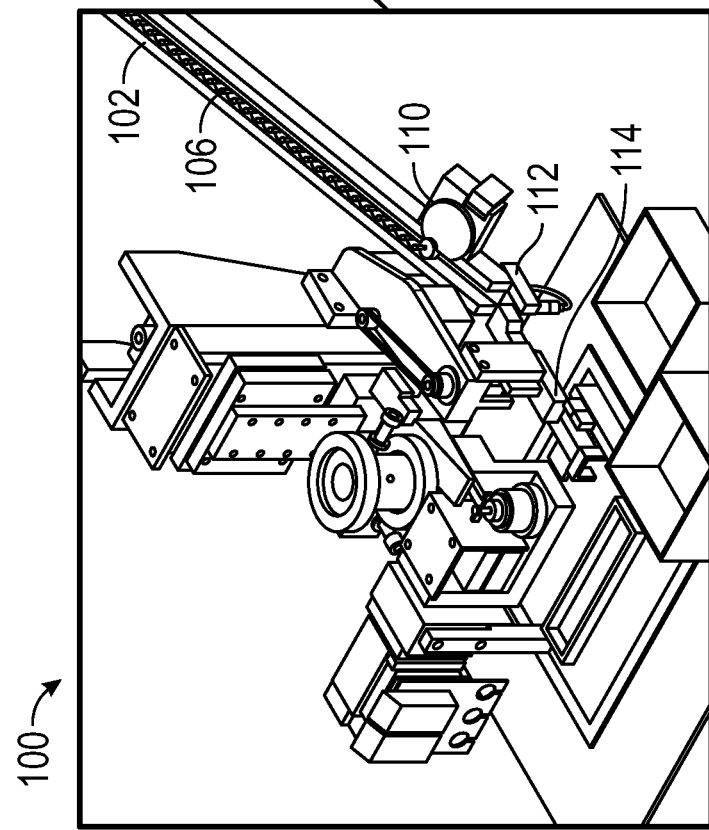
Figure 2B:
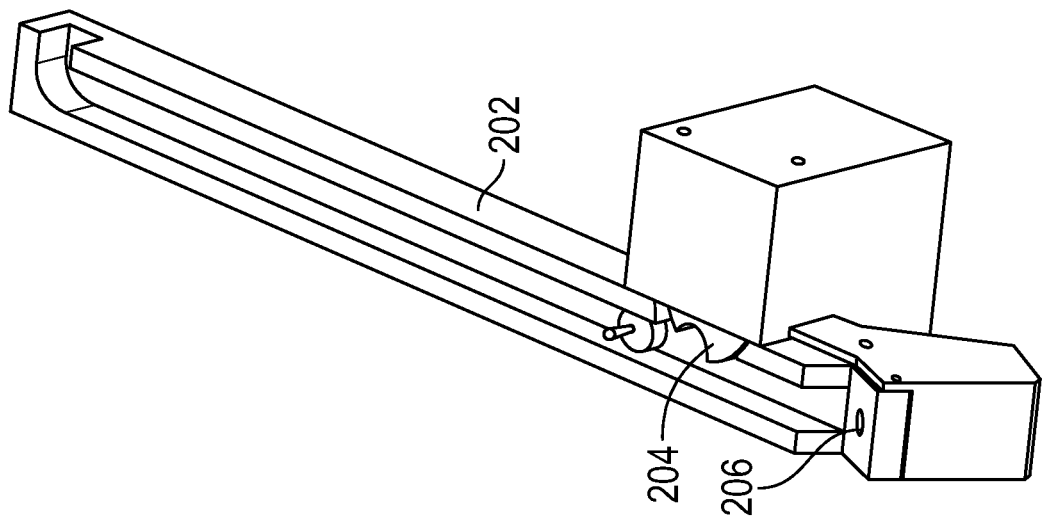
FIGS. 2 (a), 2 (b), 2 (c), and 2 (d) illustrate movement of a gemstone, affixed to a holder through a feeding conduit unit of the gemstone processing machine, in accordance with an implementation of the present subject matter.
Figure 2A:
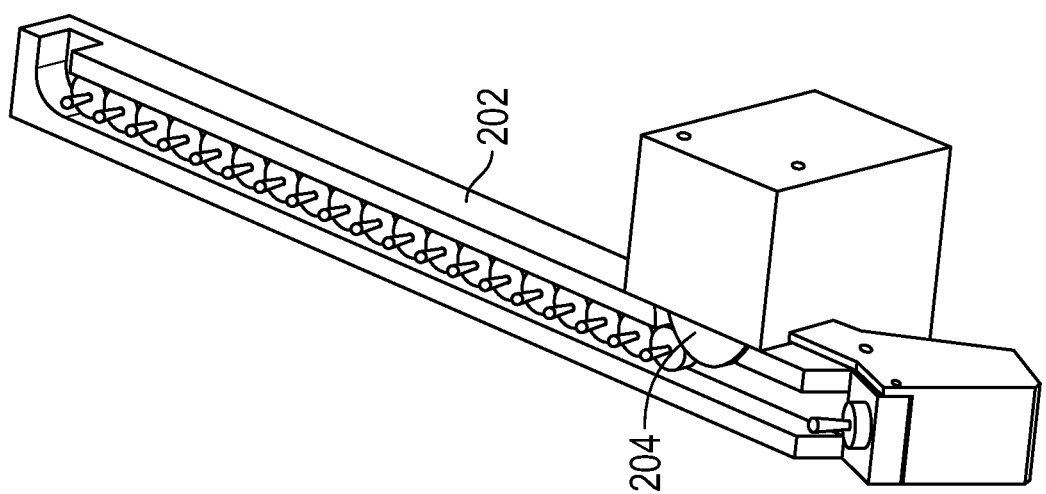
Figure 2D:
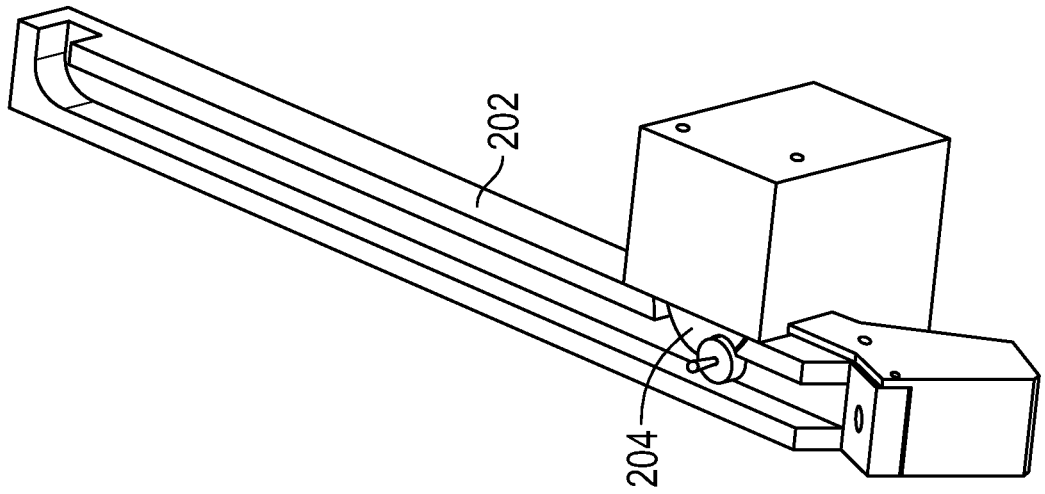
Figure 2C:
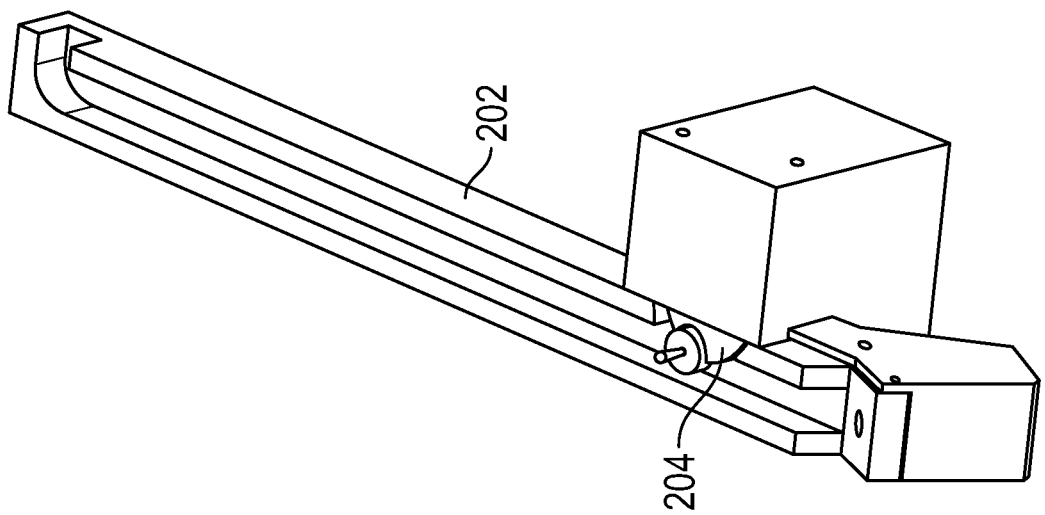

The present subject matter relates to aspects relating to automatic feeding of gemstones in a gemstone processing machine. As mentioned previously, in recent times, techniques for effective gemstone processing have been areas of active research.

Rough gemstones have irregular dimensions, and undergo diverse processing steps, such as planning, estimating, measuring physical attributes, sawing, bruiting, and polishing to reach to finished state. The processing steps may be performed on multiple machines, such as gemstone planner machine, gemstone cutting machine, and the like. Also, the processing steps may be performed on an integrated machine wherein different parts of the integrated multiple perform the various processing steps. Thus, in one case, the rough gemstone has to be moved from one machine to another during various processing steps, while in case of the integrated machine, the rough gemstone has to be moved from one part of the machine to another. For example, after measurement of physical attributes of the gemstone in the gemstone planner machine, the gemstone had to be affixed to a holder, and the holder affixed gemstone had to be provided as input to the gemstone cutting machine for further processing. Conventionally, the movement of the gemstone from one machine to another machine is carried out manually by an operator. For example, the operator picks up a gemstone from the gemstone planner machine and affixes the gemstone to the holder manually before carrying the affixed gemstone to the gemstone cutting machine. Further, at the gemstone cutting machine the operator has to manually provide each gemstone affixed to the holder as input to the gemstone cutting machine for processing one-by-one. Thus, the conventional gemstone feeding technique was dependent on human intervention and required skilled operator to perform various steps at different stage of the gemstone processing.

To this end, machines and methods for feeding gemstone affixed to a holder to a gemstone processing machine described herein. Computing device controlled automated feeding mechanism, overcomes the above-described problems associated with manual feeding technique.

Various embodiments of the present subject matter disclose a method and system for feeding rough gemstones to a gemstone processing machine. The rough gemstones are affixed to holders, such that, each gemstone is affixed to a respective holder. In an embodiment, the gemstone processing machine comprises a feeding conduit unit to receive the rough gemstones affixed to their respective holders from a user. The feeding conduit unit allows a user to provide several gemstones to the gemstone processing machine for processing at a time. The user is not required to wait for processing of a given gemstone to be completed before another gemstone can be provided to the gemstone processing machine.

The holders are received by a base plate from the feeding conduit unit. Further, the holders are transferred from the base plate to a pre-defined position on the gemstone processing machine for further processing of the rough gemstone affixed onto the holder. The transfer of the holder with its respective gemstone to a pre-defined position is executed by an actuating arm. In an embodiment, the transfer of the gemstone is effected by an actuating arm controlled by a computing device. Thus, the user is relieved of the process of picking up the gemstone from a part of the gemstone processing machine and placing the same on another part thereof.

Thus, the present subject matter relates to techniques of feeding rough gemstones to a gemstone processing machine using an automated feeding mechanism formed of feeding conduit unit and gemstone feeding unit. The automated feeding mechanism is controlled by the computing device and uses low-cost hardware equipment having limited or no manual intervention. Therefore, the gemstone feeding achieved in accordance with the techniques of the present subject matter provides a considerably accurate picking and placement of the rough gemstone onto the gemstone recessing machine and involves substantially low cost in generating the finished gemstone. In other words, the gemstone processing executed in accordance with the present subject matter achieves an apt tradeoff between the accuracy of transfer of the rough gemstone and the cost associated with the equipment used for the processing of the gemstone.

These and other advantages of the present subject matter would be described in greater detail in conjunction with the following figures. While aspects of gemstone profiling can be implemented in any number of different configurations, the embodiments are described in the context of the following device(s) and method(s).

FIG. 1 illustrate schematics of a gemstone processing machine 100 for processing rough gemstones communicatively coupled to a computing device 104, in accordance with an embodiment of the present subject matter.

The gemstone processing machine 100, according to the present subject matter, receives rough gemstones affixed to their respective holders, at a pre-defined position and transfers them to another pre-defined position without human intervention. For example, the pre-defined position may be a predesignated part of the gemstone processing machine 100 that processes the gemstones or another location of the gemstone processing machine 100 that has a bin for storing the gemstones.

In accordance with an embodiment of the present subject matter, the gemstone processing machine 100 includes a feeding conduit unit 110 to receive the gemstones 102 affixed to a holder 104. The feeding conduit unit 110 is coupled to gemstone feeding unit of the gemstone processing machine 100.

Figure 3A:
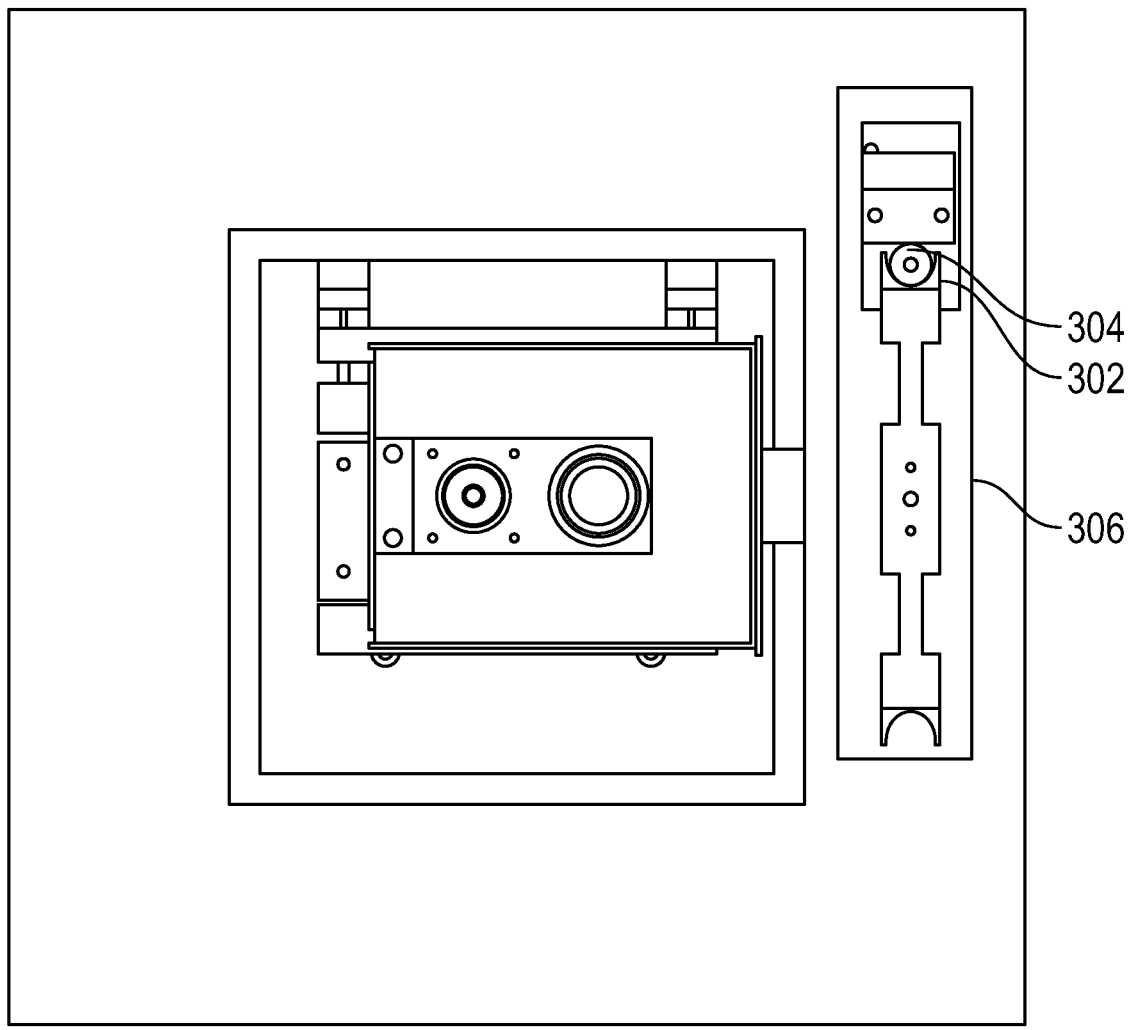
FIGS. 3 (a), 3 (b), and 3 (c) illustrate the transfer of a gemstone affixed to a holder, from base plate of gemstone feeding unit to a pre-defined position in the gemstone processing machine by actuating arm, in accordance with an embodiment of the present subject matter.

In accordance with an embodiment, the gemstone feeding unit includes a base plate 112, and an actuating arm 114. The arrangement of the feeding conduit unit 110 with the gemstone feeding unit is such that the base plate 112 of the gemstone feeding unit receive the gemstones 102, affixed to the holders 106, from the feeding conduit unit 110. The actuating arm 114 is an automated moving member, configured such that a home position (shown in FIG. 3) of the actuating arm 114 coincides with the base plate 112 of the gemstone feeding unit. Accordingly, the gemstone 102, along with its holder 106, when received at the base plate 112 is picked up by the actuating arm 114, by a detachable contact established between the holder 106 and the actuating arm 114, such that the actuating arm 114 transfers the holder 106 positioned on the base plate 112 to a pre-defined position on the gemstone processing machine 100.

For providing the movement to the actuating arm 114, the gemstone processing machine 100 can include one or more actuators (not shown) coupled to the actuating arm 114. In an example, the actuator can be a motor, say a servo motor, a stepper motor or an assembly including a motor and a gear box for generating an appropriate amount of torque to rotate the actuating arm 114. In addition, the actuator can include other assemblies or components that can be used for providing a movement to the actuating arm 114.

In an implementation, the gemstone processing machine 100 is communicatively coupled to the computing device 104. The computing device 104 controls various function of the gemstone processing machine 100. The computing device 104 may control processing of the gemstones 102 by the gemstone processing machine 100. In an example, the gemstone processing machine 100 may also control the movement of the actuating arm 114 by controlling the actuator associated with the actuating arm 114 as elaborated later.

The computing device 104 includes processor(s) 116 coupled to a memory 118. The computing device 104 further includes interface(s) 120, for example, to facilitate communication of a user with the gemstone processing machine 100. The interface(s) 120 may include a variety of software and hardware interfaces, for example, interfaces for peripheral device(s). Further, the interface(s) 120 enables the computing device 104 to communicate with other devices, such as external devices.

The processor(s) 116 may be implemented as one or more microprocessors, microcomputers, microcontrollers, digital signal processors, central processing units, state machines, logic circuitries, and/or any devices that manipulate signals based on operational instructions. Among other capabilities, the processor(s) 116 are configured to fetch and execute computer-readable instructions stored in the memory.

The memory 118 may include a computer-readable medium known in the art including, for example, volatile memory, such as static random access memory (SRAM), dynamic random access memory (DRAM), etc., and/or non-volatile memory, such as erasable program read only memory (EPROM), flash memory, etc.

Further, the memory 118 includes engine(s) 122 and data 124. The engine(s) 122 include, for example, a feeding conduit control engine 126, an actuating arm activation engine 128, an actuating arm movement engine 130, a gemstone processing engine 132, and other engine(s) 134. The other engine(s) 134 may include programs or coded instructions that supplement applications or functions performed by the computing device 104.

The data 124 includes gemstone data 136, sensor data 138, position data 140, actuation data 142, and other data 144. In one implementation, the gemstone data 136, sensor data 138, position data 140, and actuation data 142 are stored in the memory 118 of the computing device 104 while in other implementations, the gemstone data 136, sensor data 138, position data 140, and actuation data 142 may reside in an external memory, that is assessable by the computing device 104. Further, the other data 144, amongst other things, may serve as a repository for storing data, that is processed, received, or generated as a result of the execution of one or more engines in the other engine(s) 122. Although the data 124 is shown internal to the computing device 104, it may be understood that the data 124 may reside in an external repository (not shown in the figures), which is coupled to the computing device 104. The computing device may communicate with the external repository through the interface(s) 120 to obtain information from the data 124.

In an implementation, the computing device 104 receives the gemstone data 136 for a gemstone affixed to a holder from a gemstone planning machine (not shown). In another implementation, a user may feed in the gemstone data 136 to computing device 104 as the user feeds the gemstone 102 affixed to the holder 106 to the feeding conduit unit 110. The movement of the gemstones affixed to their respective holders on the feeding conduit unit 110 is controlled by the feeding conduit control engine 126 as will be explained in detail in reference to FIG. 2 later.

Once a gemstone 102 affixed to its holder 106, is received on the base plate 112 of the gemstone feeding unit, as explained earlier, a base plate sensor 206 (shown in FIG. 2) detects the same. The sensor data 138 thus generated is communicated to the processor 116. The processor 116, in turn, communicates with the actuating arm activation engine 128 and the actuating arm movement engine 130 to transfer the gemstone 102 affixed to the holder 104, from the base plate 112 to the pre-defined position.

The actuating arm movement engine 130, communicatively coupled to the processor 116, computes the position data 140 to specify the pre-defined position to which the gemstone 102, affixed to the holder 106 has be transferred. Also, the actuating arm movement engine 130, communicatively coupled to the processor 116, computes actuation data 142 to move the actuating arm 114 such that the actuating arm 114 is aligned in accordance with the pre-defined position.

In another implementation, after the transfer of the gemstone 102, affixed to the holder 106 to the pre-defined position, the gemstone processing engine 132 is invoked to perform further processing on the gemstone 102.

FIGS. 2 (a), 2 (b), 2 (c), and 2 (d) illustrate movement of the gemstone 102, affixed to the holder 106 through the feeding conduit unit 110, in accordance with an embodiment of the present subject matter. The feeding conduit unit 110 includes a conveyor and stopper 204, in an implementation.

In an example, the conveyor may be a sliding rack. In another example, the conveyor may be a conveyor belt such as, gravity conveyor, gravity skatewheel conveyor, wire mesh conveyors, plastic belt conveyors, bucket conveyors, spiral conveyors, vibrating conveyors, pneumatic conveyors, belt driven live roller conveyors, lineshaft roller conveyor, chain conveyor, and the like. In an implementation, the sliding rack 202 is a convenient and affordable implementation of the conveyor. The description hereinafter is presented considering example implementations of the sliding rack 202. The sliding rack 202 can be designed to hold multiple rough gemstones affixed to their respective holders (as illustrated in FIG. 2 (a)). Further, the stopper 204 may be positioned along the sliding rack 202 (as illustrated in FIG. 2 (a)). In an embodiment, the stopper 204 allows one holder, from amongst the multiple holders, to pass through to the base plate 112 at a time. Thus, the base plate 112 may receive only one holder from the feeding conduit unit 110 at a time.

FIGS. 2 (b), 2 (c), and 2 (d) illustrate the stopper 204 in accordance with an implementation of the present subject matter. In an example, the stopper 204 has an indentation corresponding to a profile of the holder 106, such that a holder 106, which is positioned on the feeding conduit unit 110 and abuts with the stopper 204, is allowed to pass along the sliding rack 202 when the indentation the stopper 204 aligns with the profile of the holder 106. Upon passing of a given holder from the sliding rack 202 to the base plate 112, the movement of the stopper 204 may be controlled such that another holder does not pass through the sliding rack 202 until the previous gemstone is processed. In an implementation, the feeding conduit control engine 126 controls the movement of the stopper 204.

In an embodiment, the stopper 204 may be a rotating disc, having the holder 106 profiled indentation. To enable movement of the rotating disc one or more actuators (not shown) may be coupled to the rotating disc. In an example, the actuator can be a motor, say a servo motor, or an assembly including a motor and a gear box for generating an appropriate amount of torque to rotate the rotating disc. In addition, the actuator can include other assemblies or components that can be used for providing a rotational movement to the rotating disc. The actuator may be controlled by the feeding conduit control engine.

Figure 3B:
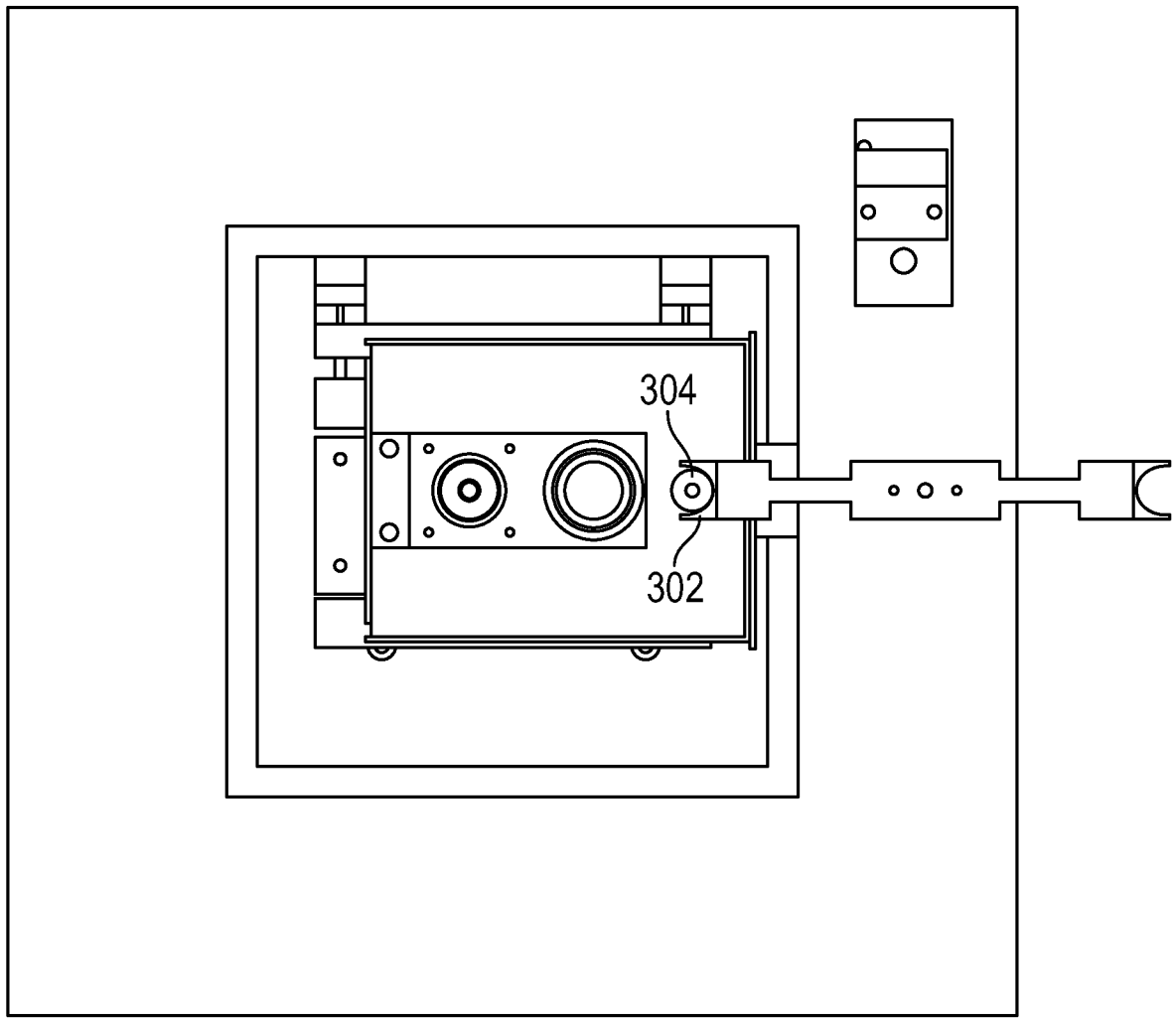
Figure 3C:
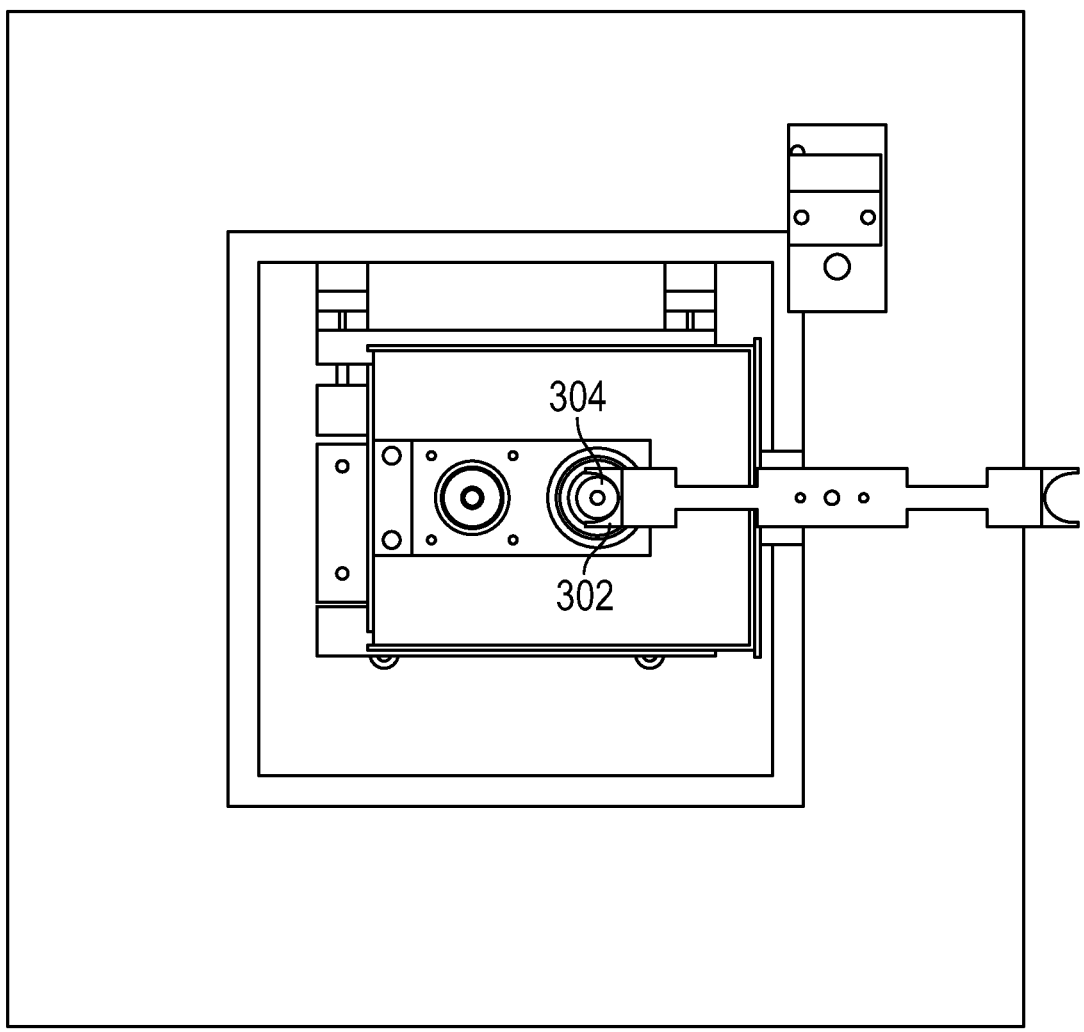

FIGS. 3 (a), 3 (b), and 3 (c) illustrate the transfer of a gemstone 102, affixed to a holder 106, from base plate 112 to a pre-defined position by the actuating arm 114, in accordance with an embodiment of the present subject matter. In an example, the actuating arm 114 has two gripping members, referred to as a first gripping member 302 and a second gripping member (shown in FIG. 4), to detachably attach to the holder 106. Each of the gripping members is provided with an electromagnet and the holders 106 are made of a magnetic material. In an implementation, the actuating arm activation engine 128 controls flow of current in the electromagnet to control the magnetic field of the electromagnet in each of the gripping member.

In an implementation, when the first gripping member 302 of the actuating arm 114 is in the home position 306 that coincides with the base plate 112 of the gemstone feeding unit, as illustrated in FIG. 3 (a), the actuating arm activation engine 128 invokes magnetic field in the first gripping member 302. The magnetic field attracts a holder, herein referred to as first holder 304, positioned on the base plate 112. The first holder 304 detachably couples to the first gripping member 302. Once, the first holder 304 is attached to the first gripping member 302, the actuating arm movement engine 130 provides inputs to the actuator of the actuating arm 114, such that, the actuating arm 114 rotates and aligns the along a location of the pre-defined position on the gemstone processing machine 100. In an embodiment, to align to a location of a pre-defined position, the first gripping member 302 can move along X, Y, and Z axis.

As can be seen in FIG. 3 (b) the pre-defined position may be a rotating disc of a cutting fixture of the gemstone processing machine 100. Upon, proper alignment of the actuating arm 114 and the first holder 304, the actuating arm activation engine 128 varies current supply in the electromagnet of the first gripping member 302, such that, the first holder 304 detaches from the first gripping member 302 and is placed at the pre-defined position for further processing by the gemstone processing engine 132. The processing of the gemstone 102 at the pre-defined position is based on gemstone data 136.

In an embodiment, the actuating arm 114 may be aligned to the home position 306 after successful transfer of the first holder 304 to the pre-defined position.

In an embodiment, the actuating arm movement engine 130 may also move the actuating arm 114 linearly to align the first gripping member 302 with the first holder 304 exactly over the rotating disc of the cutting fixture (as illustrated in FIG. 3 (c)). In an example, the actuating arm 114 moves along X-Y plane. In another example, the actuating arm 114 rotates along Z-axis. The actuating arm 114 may rotate by a pre-defined angle with respect to the home position 306. In an embodiment, the pre-defined angle is based on the pre-defined position and is controlled by the actuating arm movement engine 130 of the computing device 104. For example, in accordance with FIG. 3 (a) the actuating arm 114 would be rotated by pre-defined angle of 90 degrees to left of the home position 306, when the actuating arm 114 has to align along the pre-defined position, i.e., along the rotating disc of the cutting fixture, as illustrated in FIGS. 3 (b) and 3 (c).

Figure 4A:
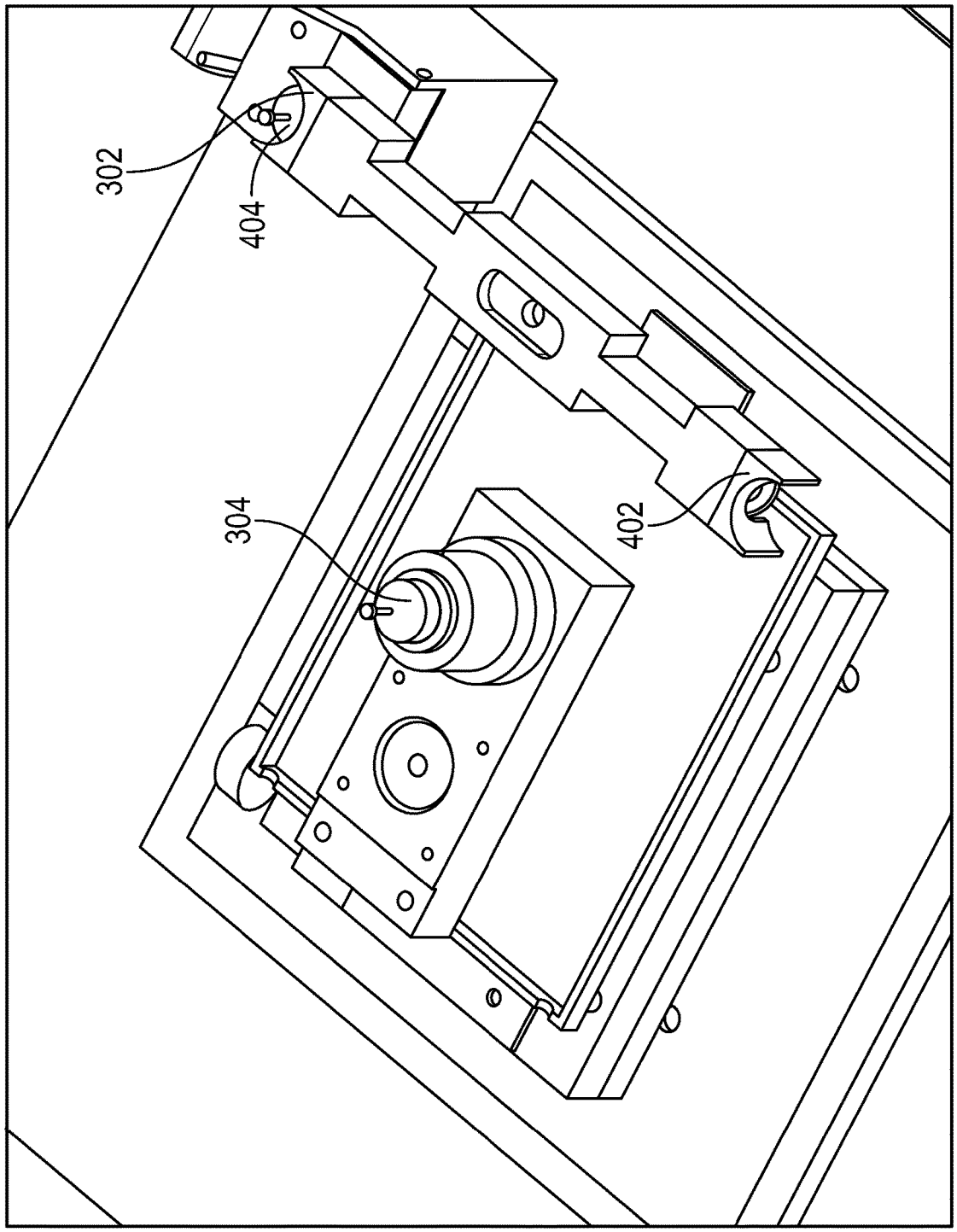
FIGS. 4 (a), and 4 (b) illustrate a first gripping member and a second gripping member of actuating arm operate in parallel, in accordance with an implementation of the present subject matter.
Figure 4B:
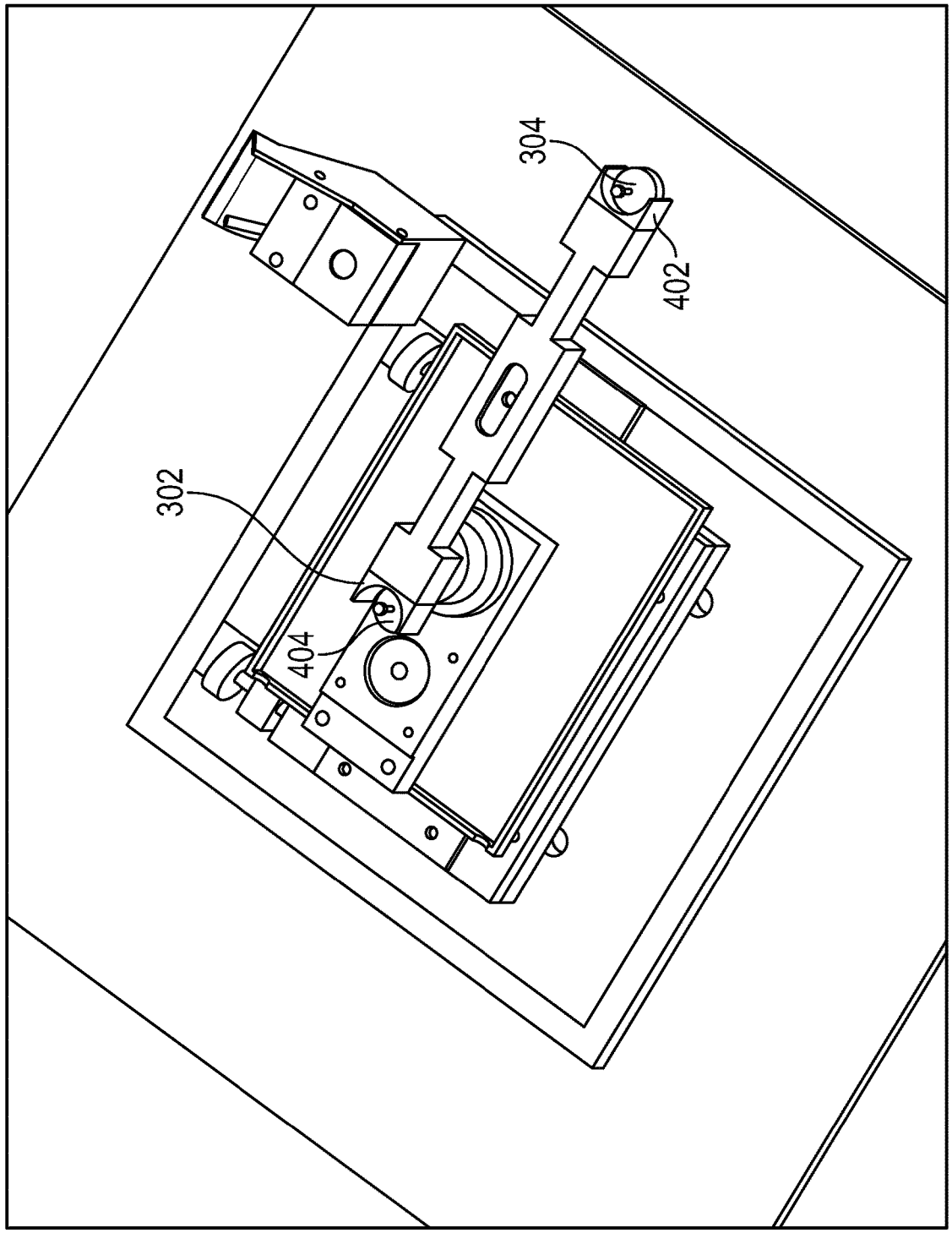

FIGS. 4 (a), and 4 (b) illustrate parallel operation of the first gripping member 302 and the second gripping member 402, in accordance with an embodiment of the present subject matter. As illustrated in FIG. 4 (a), while gemstone on the first holder 304 is processed at the pre-defined position, the first gripping member 302 may be actuated by the actuating arm movement engine 130 to align to the home position 306. The first gripping member 302 may be detachably attached to a second holder 404 by the actuating arm activation engine 128, as elaborated in description of FIG. 3(a).

After, the processing of the first holder 304 is complete, the actuating arm 114 may be actuated to align the second gripping member 402 along the first holder 304. The actuating arm activation engine 128 may vary current supply to the second gripping member 402 such that the first holder 304 detachably attaches to the second gripping member 402, as illustrated in FIG. 4 (b). In an implementation, the second holder 404 may be detachably attached to the first gripping member 302 while the first holder 304 may be detachably attached to the second gripping member 402, as illustrated in FIG. 4 (b). In another implementation, the first holder 304 may be transferred by the second gripping member 402 to another pre-defined position in the gemstone processing machine 100, such as a bin, or next stage of gemstone processing. For instance, a bin may be a bin for holders once the gemstones have been processed and removed from the holders. In another example, the bin may hold gemstones that have been found ineligible for further processing by the gemstone processing machine, for instance, if a gemstone is found to have inclusion that render it not very valuable, the same may not be processed. Also, the second holder 404 may be transferred by the first gripping member 302 to pre-defined position, previously occupied by the first holder 304, for processing of gemstone affixed to the second holder 404.

Figure 5:
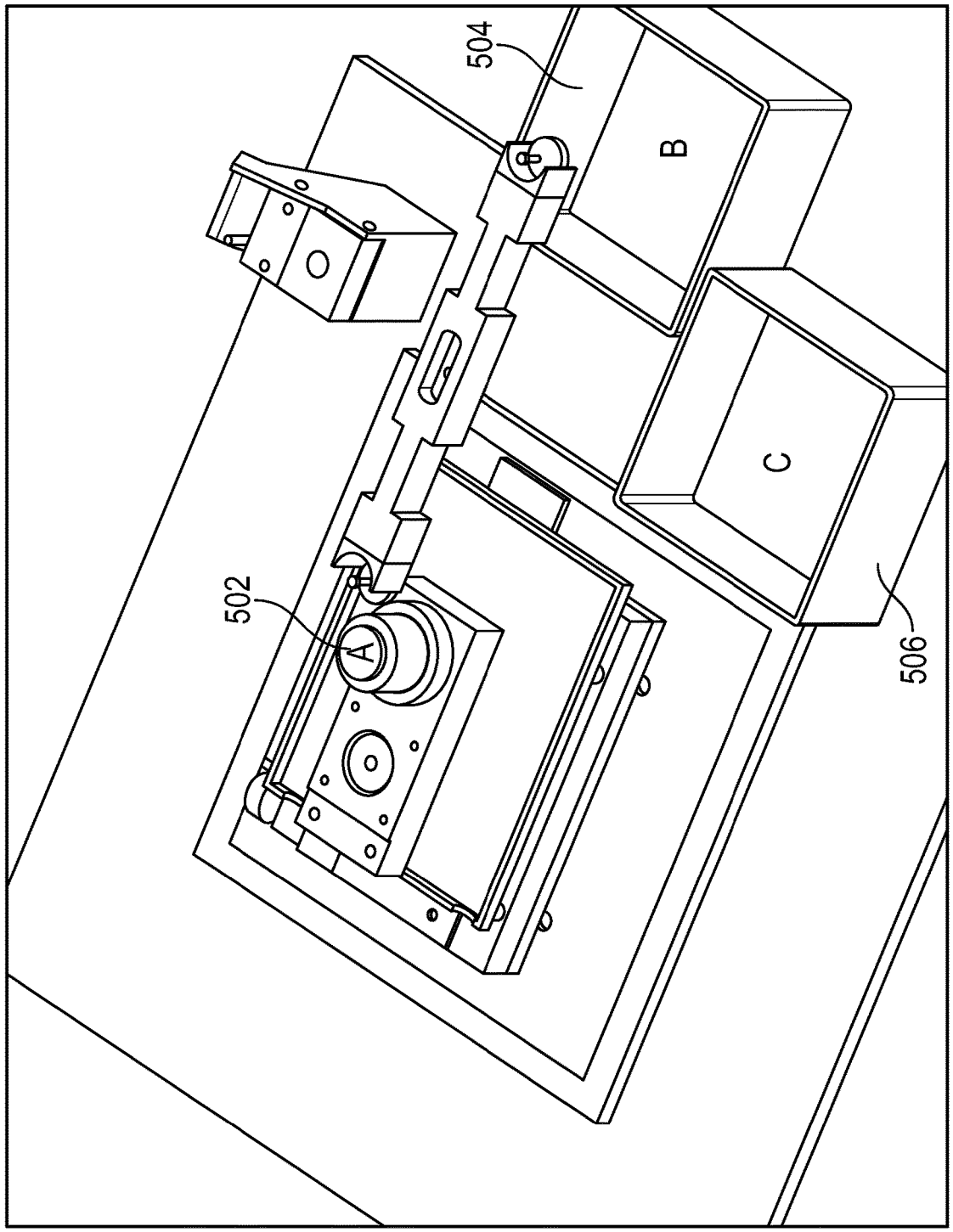
FIG. 5 illustrates pre-defined positions for transfer of the holders, in accordance with an embodiment of the present subject matter.

FIG. 5 illustrates pre-defined positions for transfer of the holders, in accordance with an embodiment of the present subject matter. In an example, pre-defined position A 502 is the rotating disc of the cutting fixture of the gemstone processing machine. At pre-defined position A 502 the rough gemstone 102 affixed to the holder 106 is processed in accordance with the gemstone data 136 by the gemstone processing engine 132 of the computing device 104. In another example, pre-defined position B 504 is a bin for storage of processed gemstones and/or holders. In yet another example, pre-defined position C 506 is a bin for storage of unprocessed gemstones.

The automated feeding mechanism elaborated in FIGS. 1-5 is controlled by the computing device 104 and uses low-cost hardware equipment having limited or no manual intervention. Therefore, the gemstone feeding achieved in accordance with the techniques of the present subject matter provides a considerably accurate picking and placement of the rough gemstone onto the gemstone processing machine 100 and involves substantially low cost in generating the finished gemstone. Also, varying of magnetic field of the electromagnets in the gripping members of the actuating arm 114, by varying of the current supply by the computing device 104, would ease the transfer of heavy gemstones or holders. Also, varying of the current supply ensures that apt amount of electricity supply is used by the gemstone processing machine 100, amounting to energy efficient gemstone processing machine 100. In other words, the gemstone processing executed in accordance with the present subject matter achieves an apt tradeoff between the accuracy of transfer of the rough gemstone, the cost associated with the equipment used for the processing of the gemstone, and energy efficiency of the gemstone processing machine 100.

Method 600 is described in FIG. 6 for feeding gemstones in a gemstone processing machine 100, according to an implementation of the present subject matter. The order in which the method 600 are described is not intended to be construed as a limitation, and any number of the described method blocks can be combined in any appropriate order to execute the method 600 or an alternative method. Additionally, individual blocks may be deleted from the method 600 without departing from the spirit and scope of the subject matter described herein.

The method 600 can be performed by programmed computing devices 104, for example, based on instructions retrieved from non-transitory computer readable media. The computer readable media can include machine-executable or computer-executable instructions to perform all or portions of the described method. The computer readable media may be, for example, digital memories, magnetic storage media, such as a magnetic disks and magnetic tapes, hard drives, or optically readable data storage media.

In the present example, the method 600 may be performed by the processor (s) 116 and engines 122 of the computing device 104 communicatively coupled to the gemstone processing machine 100, as explained above. For the sake of brevity of description of FIG. 6, the components of the processor 116 and the engines 122 performing the various steps of the method 600 are not described in detail with reference to FIG. 6. Such details are provided in the description with reference to FIG. 1.

Referring to block 602, the gemstone 102 mounted in a holder 106 is received from a user. The feeding conduit unit 110 may receive the gemstone 102 mounted in the holder 106. In an implementation, the feeding conduit unit 110 may receive multiple gemstones mounted in their corresponding holders from the user.

At block 604, the gemstone 102 mounted in the holder 106 may be allowed to be positioned on a base plate 112 of the gemstone feeding unit. In an embodiment, the stopper 204 positioned along the sliding rack 202 of the feeding conduit unit 110 allows a holder 106, from amongst the multiple holders, to pass through the sliding rack 202 to be positioned at the base plate 112.

At block 606, the holder 106 may be transferred to a pre-defined position in the gemstone processing machine 100. In an example, determination of the pre-defined position is controlled by the computing device 104. The transfer of the holder 106 may be executed by the actuating arm 114 detachably contacting with the base plate 112. In an implementation, the holder 106 may engage with the gripping member of the actuating arm 114 electromagnetically. The engagement is controlled by the computing device 104.

Although implementations for gemstone feeding are described, it is to be understood that the present subject matter is not necessarily limited to the specific features of the systems or methods described herein. Rather, the specific features and methods are disclosed as implementations for gemstone feeding.

We claim:
1. A gemstone processing machine comprising:
   a feeding conduit unit to receive at least one rough gemstone affixed to a holder from a user; and
   a gemstone feeding unit comprising:
   a base plate to receive the holder through the feeding conduit unit; and
   an actuating arm to detachably contact with the holder positioned on the base plate, to transfer the holder to a pre-defined position on the gemstone processing machine, wherein the actuating arm comprises a first gripping member and a second gripping member, the first gripping member and the second gripping member being provided at diametrically opposite ends of the actuating arm.

2. The gemstone processing machine as claimed in claim 1, wherein the base plate has a sensor to detect presence of the holder.

3. The gemstone processing machine as claimed in claim 1, wherein the feeding conduit unit comprises:
- a conveyor to hold a plurality of rough gemstones affixed to their respective holders; and
- a stopper positioned along the conveyor for allowing one holder, from amongst the plurality of the holders, to pass through to the base plate.

4. The gemstone processing machine as claimed in claim 3, wherein the conveyor is a sliding rack.

5. The gemstone processing machine as claimed in claim 3, wherein the stopper is a rotating disc having an indentation corresponding to a profile of the holders, such that the holder is allowed to pass along the sliding rack when the indentation aligns with the holder.

6. The gemstone processing machine as claimed in claim 1, wherein the actuating arm moves in X-Y plane.

7. The gemstone processing machine as claimed in claim 1, wherein the actuating arm rotates about Z-axis.

8. The gemstone processing machine as claimed in claim 7, wherein the actuating arm rotates by a pre-defined angle.

9. The gemstone processing machine as claimed in claim 8, wherein the pre-defined angle is based on the pre-defined position and is controlled by a computing device.

10. The gemstone processing machine as claimed in claim 1, wherein the pre-defined position corresponds to a rotating disc of a cutting fixture of the gemstone processing machine.

11. The gemstone processing machine as claimed in claim 1, wherein the pre-defined position is a bin for one of a processed gemstone, a bin for unprocessed gemstone and holders located within the gemstone processing machine.

12. The gemstone processing machine as claimed in claim 1, wherein the actuating arm has at least one gripping member to detachably attach to the holder, wherein the gripping member is provided with an electromagnet, and wherein the holder is made of a magnetic material.

13. The gemstone processing machine as claimed in claim 12, wherein of the electromagnet is actuated by a computing device, and wherein the holder attaches to the gripping member upon actuation of the electromagnet.

14. The gemstone processing machine as claimed in claim 13, wherein magnetic field of the electromagnet is controlled by varying current supply to the electromagnet.

15. A method for feeding gemstones in a gemstone processing machine, the method comprising:
- receiving, at a feeding conduit unit, at least one rough gemstone mounted on a holder from a user;
- allowing the holder to be positioned on a base plate of a gemstone feeding unit;
- transferring, by an actuating arm detachably contacting with the holder, the holder positioned on the base plate to a pre-defined position in the gemstone processing machine, wherein the actuating arm comprises a first gripping member and a second gripping member, the first gripping member and the second gripping member being provided at diametrically opposite ends of the actuating arm; and
- processing, by the gemstone processing engine, the at least one rough gemstone on the holder.

16. The method as claimed in claim 15, wherein a stopper positioned along a sliding rack of the feeding conduit unit allows a holder from, amongst plurality of holders, to pass through the sliding rack to be positioned on the base plate.

17. The method as claimed in claim 15, further comprising engaging the holder with a gripping member of the actuating arm electromagnetically.

18. The method as claimed in claim 17, wherein the engaging is controlled by a computing device.

19. The method as claimed in claim 15, wherein determination of the pre-defined position is controlled by a computing device.

* * * * *